United States Patent
Chen et al.

(10) Patent No.: US 12,286,220 B2
(45) Date of Patent: Apr. 29, 2025

(54) ROTOR CRAFT AND NEGATIVE TORSION VARIABLE PADDLE THEREOF

(71) Applicant: Nanjing University of Aeronautics and Astronautics, Nanjing (CN)

(72) Inventors: Zhe Chen, Nanjing (CN); Xu Zhou, Nanjing (CN); Qijun Zhao, Nanjing (CN); Zhuangzhuang Cui, Nanjing (CN); Binwu Ren, Nanjing (CN); Muyang Lin, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 18/430,816

(22) Filed: Feb. 2, 2024

(65) Prior Publication Data
US 2024/0270379 A1 Aug. 15, 2024

(30) Foreign Application Priority Data
Feb. 10, 2023 (CN) .......................... 202310103717.8

(51) Int. Cl.
*B64C 27/473* (2006.01)
(52) U.S. Cl.
CPC .... *B64C 27/473* (2013.01); *B64C 2027/4736* (2013.01)

(58) Field of Classification Search
CPC ........ B64C 27/32–72; B64C 27/78–80; B64C 2027/7205–7294
See application file for complete search history.

(56) References Cited

PUBLICATIONS

First Office Action issued by the State Intellectual Property Office of People's Republic of China on Dec. 9, 2023 for corresponding priority application No. 202310103717.8.
English Translation of First Office Action issued by the State Intellectual Property Office of People's Republic of China on Dec. 9, 2023 for corresponding priority application No. 202310103717.8.

*Primary Examiner* — Brian O Peters
(74) *Attorney, Agent, or Firm* — Nicholas Pfeifer; Smith & Hopen, P. A.

(57) ABSTRACT

The present disclosure provides a negative torsion variable paddle and a control assembly thereof. The paddle includes rigid first paddles and rigid second paddles. When a driver pushes a root railing edge, the first paddle is not flexibly deformed, and the second paddle is torsionally deformed with a laminated elastomer structure between cascades to realize relative rotation at both ends of the second paddle, so that a flexible skin maintains airfoil contours, and the whole torsional degree of the paddle is changed. The present disclosure also provides a rotor craft including the negative torsion variable paddle.

18 Claims, 3 Drawing Sheets

ROTOR CRAFT AND NEGATIVE TORSION VARIABLE PADDLE THEREOF

CROSS-REFERENCE TO RELATED APPLICATION

This patent application claims the benefit and priority of Chinese Patent Application No. 202310103717.8, filed with the China National Intellectual Property Administration on Feb. 10, 2023, the disclosure of which is incorporated by reference herein in its entirety as part of the present application.

TECHNICAL FIELD

The present disclosure relates to the technical field of crafts and surrounding supporting facilities thereof, in particular to a rotor craft and a negative torsion variable paddle thereof.

BACKGROUND

The tilt rotor is a novel aircraft which combines the fixed wing aircraft with the helicopter. The tilt rotor has not only the vertical take-off and landing and hovering capacities of helicopters, but also the high-speed cruise flight capacity of the propeller aircraft. The tilt rotor has great application prospects in military and civil fields in the future. However, the rotor has different design requirements in different flight modes. In a helicopter mode, negative torsion can change the distribution of induced velocity in the flow field and improve the efficiency of hovering in the helicopter mode, but excessive negative torsion of the rotor can result in root stall. However, during high-speed forward flight in a fixed-wing mode, the inflow of the rotor is large, and large paddle negative torsion is needed to ensure that each airfoil profile has a high angle of attack to generate enough lift. Obviously, the performances of the tilt rotor in two modes cannot be developed by using the same pair of rotors.

It can be seen that one of difficulties in tilt rotor design is rotor/propeller design. The rotor provides lift in a helicopter mode and forward power in an aircraft mode. From the point of view of rotor performance and flight efficiency, there is a contradiction between the design requirements of rotor paddles. In order to improve the working efficiency of the rotor/propeller system in different modes, there are two technical routes at present. At present, the aerodynamic efficiency is easily improved by changing the working speed of the rotor in different flight modes. In a helicopter mode, the rotor rotates at a high speed and has enough lift to achieve vertical take-off. In a fixed wing mode, the rotor speed is reduced to reduce the resistance and consumption during flight. However, it is difficult to ensure that both working speeds are within the performance range of the engine, even near the optimal working speed of the engine.

In addition, the rotor variant technology is a way to improve the efficiency of the tilt rotor. The variable diameter technology is one of the technologies. In a helicopter mode, the rotor radius is relatively large to generate great tension to achieve flight. In a fixed wing mode, the rotor radius is shortened, the rotor tip speed and cross-sectional area are reduced, and the propulsion performance is better at this time. However, the method brings great changes to the paddle structure, especially for rotating parts. The changes of rotor radius and structural characteristics may bring unpredictable dynamic problems.

Therefore, torsional variation of the rotor is a feasible way to improve rotor performance. At present, many scholars have carried out in-depth theoretical analysis of rotor/propeller variable speed and variable diameter technology, but how to realize theoretical analysis through mechanical equipment is an important problem to be solved.

Taking the variable speed technology as an example, the shaft extension speed of the engine turbine is changed, the rotating speed of the rotor can be directly changed without changing the transmission mechanism. Or, the transmission ratio between the shaft extension of the engine and the rotor is changed to realize different rotor speeds under a single shaft extension speed. The former can realize the steady change of rotor speed in the transmission process, which brings low overload and impact to the transmission mechanism. On the other hand, the change of engine speed can lead to the change of characteristic parameters such as fuel consumption and thrust-weight ratio, especially the decrease of engine efficiency. The latter adopts the form of variable transmission ratio to ensure the best working speed of the engine, but the change of transmission ratio in the transmission mechanism must be caused by the change of transmission links, so that the transmission mechanism generates impact load to affect the service life of the structure. The diameter technology involves the change of rotor three-dimensional structures, including a mechanical mechanism with a elongated or shortened rotor, and a driving device, resulting in the change of rotor stiffness, mass distribution and structural characteristics during working. At the same time, the extra variable length mechanism and driving mechanism of each paddle become extra burden in the rotating parts, which may become potential safety hazards during flight.

North China University of Technology and Tsinghua University use temperature memory metal to manufacture torsion tubes, and different torsion distribution of paddles at two temperatures is realized. However, for the complicated rotor flow field, the air flow speed is high, and the heat is quickly taken away by the air flow, so it is difficult to change and maintain the temperature in the local area of the rotor, and the cost of using memory metal is high.

SUMMARY

The present disclosure aims to provide a rotor craft and a negative torsion variable paddle thereof so as to solve the problems in the prior art. The variable torsion of the paddle is realized by using a mechanical structure, so that the flight performance of the rotor craft is improved.

In order to achieve the purpose, the present disclosure provides the following scheme. The present disclosure provides a negative torsion variable paddle, including:

a control assembly; the control assembly includes a main shaft and a driver, the main shaft can be connected with a hub, the driver is connected with the main shaft, and the main shaft can also be connected with a pull rod of a swashplate;

a composite paddle; the main shaft is connected with a leading edge of the composite paddle, and an output end of the driver is in transmission connection with a trailing edge of the composite paddle; the composite paddle includes first paddles and second paddles, the first paddle is connected with the second paddle, the first paddle or the second paddle farthest away from the control assembly is fixedly connected with the main shaft, and the rest of the first paddles and the second paddles are rotatably connected with the main shaft; the first paddle is of a rigid structure, the second paddle includes a deformed layer, a cascade and a flexible skin, the deformed layer is made of elastic materials, the number of the deformed layers is multiple, the deformed layers are arranged in parallel along the direction of the main shaft, the adjacent deformed layers are connected at intervals by using the cascade, the cross-sectional shape of the cascade is consistent with that of the first paddle, the flexible skin covers the outside of the deformed layer and the cascade, and the flexible skin can be connected with the first paddle.

Preferably, the first paddles and the second paddles are arranged at intervals, the paddles farthest away from the control assembly and closest to the control assembly are the first paddles, and the output end of the driver is connected with a trailing edge of the first paddle closest to the control assembly.

Preferably, the length of the second paddle close to the control assembly is longer than that of the second paddle far away from the control assembly.

Preferably, the deformed layer is of a hollow cylindrical structure, and the deformed layer and the cascade both sleeve on the main shaft.

Preferably, the deformed layer is made of rubber, the cascade is made of metal, and the deformed layer is vulcanized and connected with the cascade.

Preferably, the control assembly also includes clamping plates, the clamping plate is provided with a protrusion adapted to the main shaft, the number of the clamping plates is two, the two clamping plates are symmetrically arranged with an axis of the main shaft as a symmetry axis, the two clamping plates are connected and fixed with the main shaft through bolts, a base plate is arranged between the two clamping plates, the pull rod is rotatably connected with the clamping plate, and the driver is fixed on the clamping plate.

Preferably, the pull rod is T-shaped, a notch is formed in the clamping plate, and a bearing is arranged between the pull rod and the clamping plate.

Preferably, the driver is a linear steering engine, and the output end of the driver is connected with the composite paddle by using a connecting rod.

Preferably, one end of the connecting rod is connected with the output end of the driver by using a ball hinge, and the other end of the connecting rod is slidably and rotatably connected with the composite paddle; a rotating axis, relative to the composite paddle, of the connecting rod is parallel to the axis direction of the main shaft; and a sliding axis, relative to the composite paddle, of the connecting rod is parallel to the axis direction of the main shaft.

The present disclosure also provides a rotor craft including the negative torsion variable paddle.

Compared with the prior art, the present disclosure has the following technical effects.

According to the negative torsion variable paddle in the present disclosure, the main shaft of the control assembly can be connected with the hub to drive the composite paddle to rotate. The main shaft is connected with the swashplate by using the pull rod. The swashplate can drive the main shaft and the composite paddle to rotate so as to realize the control for propeller pitch. The main shaft is connected with a leading edge, at the tip of the paddle, of the composite paddle, and the output end of the driver is connected with a trailing edge, at the root of the paddle, of the composite paddle, so that the composite paddle can be driven to be torsionally varied. Specifically, the composite paddle includes first paddles and second paddles. When a driver pushes a root trailing edge of the composite paddle, the first paddle or the second paddle connected with the driver rotates around a main shaft, and then all of the first paddles and the second paddles movably connected with the main shaft are driven to rotate. The second paddle includes the deformed layer connected by using the cascade, so that the second paddle can be deformed to form a laminated elastomer structure. The deformed layer of the second paddle generates shear deformation, so that both ends of the composite paddle can rotate relatively, and the whole composite paddle is torsionally deformed. Centrifugal force is transmitted to the composite paddle part fixedly connected with the main shaft and to a hub through the main shaft, and the radial load of the composite paddle is transmitted by the compression of the deformed layer. It should also be noted that the first paddle is of a rigid structure, so that the structural strength of the composite paddle is ensured. The cross-sectional shape of the cascade of the second paddle is consistent with that of the first paddle. The cascade further improves the structural strength of the composite paddle. The flexible skin covers the deformed layer and the cascade, so that the streamlined design of the composite paddle is ensured, and the flight resistance of the negative torsion variable paddle is reduced. The torsional variation of the composite paddle is realized by using the mechanical structure, and the working reliability of the negative torsion variable paddle is improved under the premise of without changing the radius of the composite paddle.

At the same time, the present disclosure also provides a rotor craft including the negative torsion variable paddle. The torsional variation of the composite paddle is realized by using the mechanical structure, so that the adaptability of the rotor craft is improved.

BRIEF DESCRIPTION OF THE DRAWINGS

To more clearly illustrate the present embodiment of the present disclosure or the technical scheme in the prior art, the following briefly introduces the attached figures to be used in the present embodiment. Apparently, the attached figures in the following description show merely some embodiments of the present disclosure, and those skilled in the art may still derive other drawings from these attached figures without creative efforts.

Figure 1:
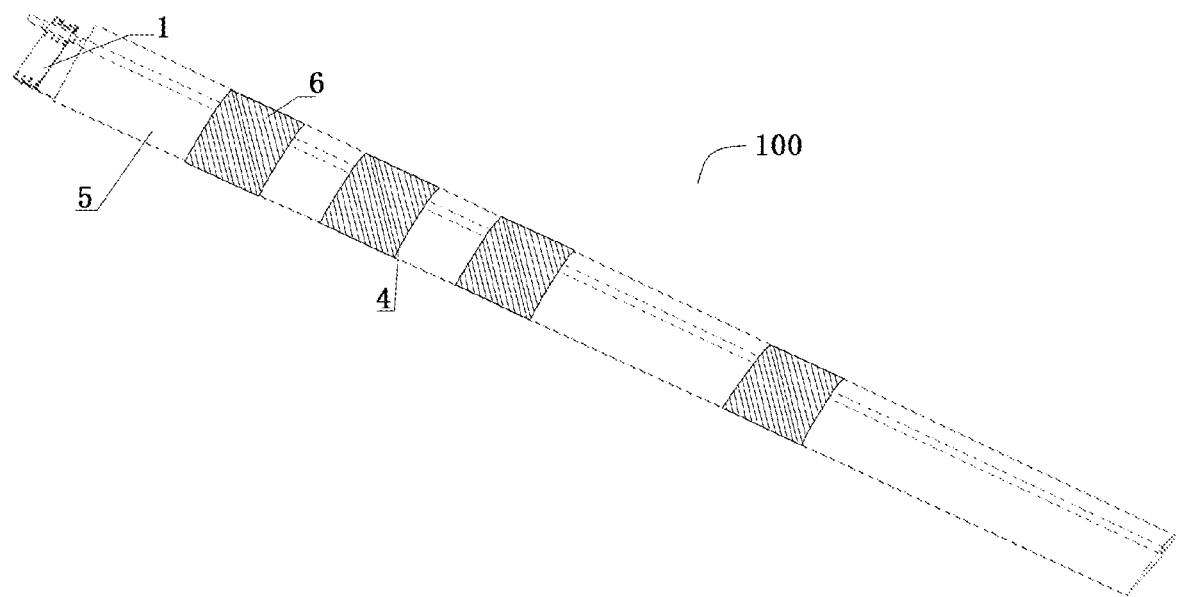
FIG. 1 is a structural schematic diagram of a negative torsion variable paddle in the present disclosure.
Figure 2:
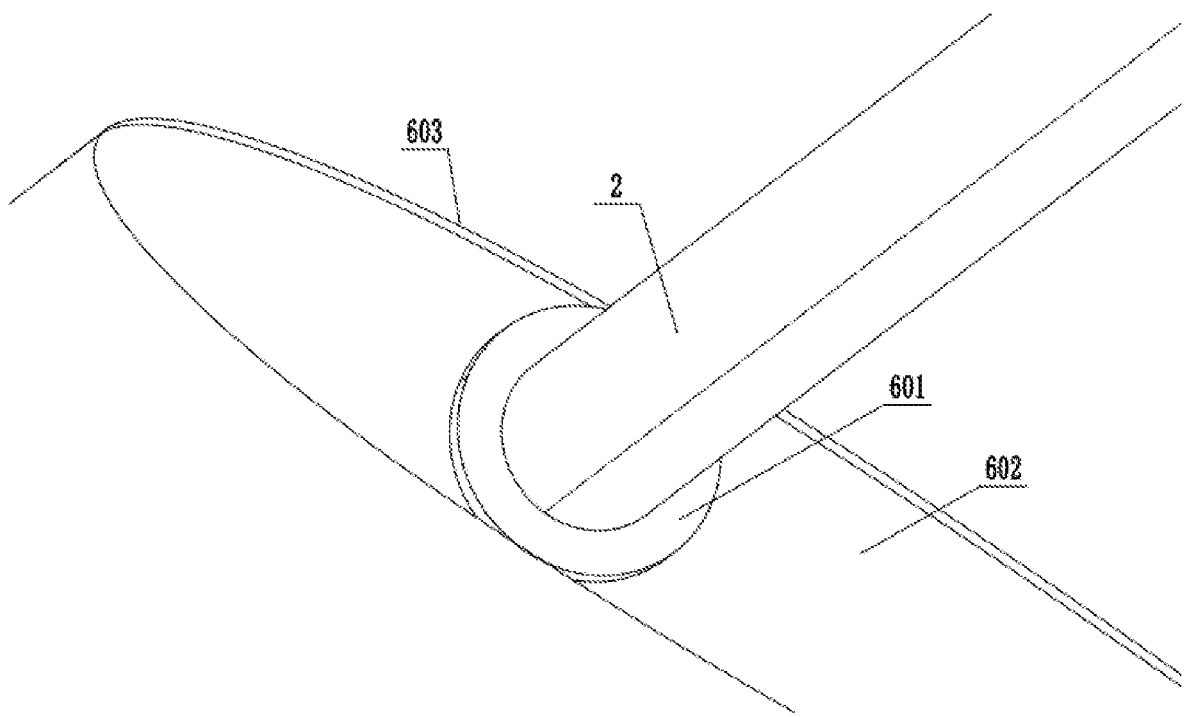
FIG. 2 is a structural schematic diagram of a second paddle of a negative torsion variable paddle in the present disclosure.
Figure 3:
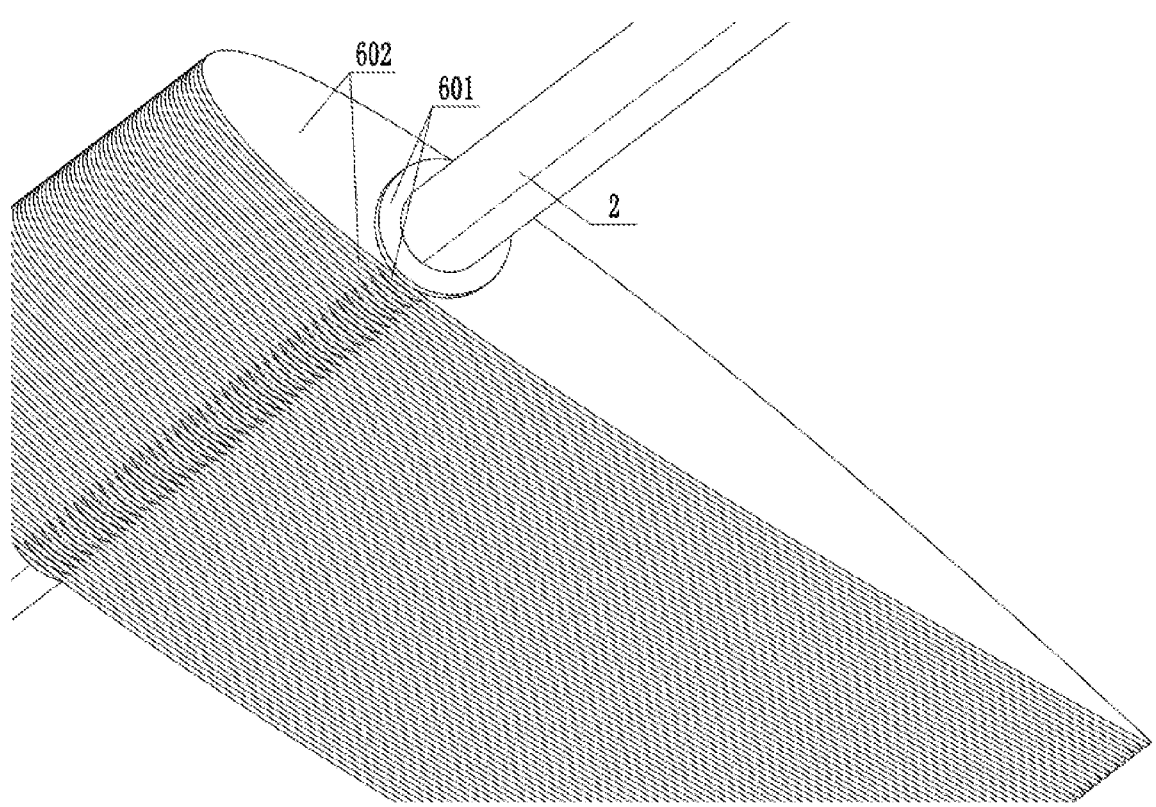
FIG. 3 is a partial structural schematic diagram of a second paddle of a negative torsion variable paddle in the present disclosure.

Reference signs: 100, negative torsion variable paddle; 1, control assembly; 2, main shaft; 3, driver pull rod; 4, composite paddle; 5, first paddle; 6, second paddle; 601, deformed layer; 602, cascade; 603, flexible skin; 7, clamping plate; 8, base plate; 9, connecting rod; 901, transverse rod; 902, longitudinal rod; and 10, pull rod.

DETAILED DESCRIPTION OF THE EMBODIMENTS

The following clearly and completely describes the technical scheme in the embodiments of the present disclosure with reference to the embodiments of the present disclosure. Apparently, the described embodiments are merely a part rather than all of the embodiments of the present disclosure.

Based on the embodiment in the present disclosure, all other embodiments acquired by the ordinary technical staff in the art under the premise of without contributing creative labor belong to the scope protected by the present disclosure.

The present disclosure aims to provide a rotor craft and a negative torsion variable paddle thereof so as to solve the problems in the prior art. The variable torsion of the paddle is realized by using a mechanical structure, so that the flight performance of the rotor craft is improved.

To make the foregoing objective, features and advantages of the present disclosure clearer and more comprehensible, the present disclosure is further described in detail below with reference to the attached figures and specific embodiments.

The present disclosure provides a negative torsion variable paddle 100, including a control assembly 1 and a composite paddle 4, wherein the control assembly 1 includes a main shaft 2 and a driver 3, the main shaft 2 can be connected with a hub, the driver 3 is connected with the main shaft 2, and the main shaft 2 can also be connected with a pull rod 10 of a swashplate; the main shaft 2 is connected with a leading edge of the composite paddle 4, an output end of the driver 3 is in transmission connection with a trailing edge of the composite paddle 4; the composite paddle 4 includes first paddles 5 and second paddles 6, the first paddle 5 is connected with the second paddle 6, the first paddle 5 or the second paddle 6 farthest away from the control assembly 1 is fixedly connected with the main shaft 2, and the rest of the first paddles 5 and the second paddles 6 are rotatably connected with the main shaft 2; the first paddle 5 is of a rigid structure, the second paddle 6 includes a deformed layer 601, a cascade 602 and a flexible skin 603, the deformed layer 601 is made of elastic materials, the number of the deformed layers 601 is multiple, the deformed layers 601 are arranged in parallel along the direction of the main shaft 2, the adjacent deformed layers 601 are arranged at intervals by the using cascade 602, the deformed layer 601 is connected with the cascade 602, the cross-sectional shape of the cascade 602 is consistent with that of the first paddle 5, the flexible skin 603 covers the outside of the deformed layer 601 and the cascade 602, and the flexible skin 603 can be connected with the first paddle 5.

According to the negative torsion variable paddle 100 in the present disclosure, the main shaft 2 of the control assembly 1 can be connected with the hub to drive the composite paddle 4 to rotate. The main shaft 2 is connected with the swashplate by using the pull rod 10. The swashplate can drive the main shaft 2 and the composite paddle 4 to rotate so as to realize the control for propeller pitch. The main shaft 2 is connected with a leading edge, at the tip of the paddle, of the composite paddle 4, and the output end of the driver 3 is connected with a trailing edge, at the root of the paddle, of the composite paddle 4, so that the composite paddle 4 can be driven to be torsionally varied. Specifically, the composite paddle 4 includes first paddles 5 and second paddles 6. When the driver 3 pushes a root trailing edge of the composite paddle 4, the first paddle 5 or the second paddle 6 connected with the driver 3 rotates around the main shaft 2, and then all of the first paddles 5 and the second paddles 6 movably connected with the main shaft 2 are driven to rotate. The second paddle 6 includes the deformed layer 601 connected by using the cascade 602 to form a laminated elastomer structure. The deformed layer 601 generates shear deformation, so that the adjacent cascades 602 rotates relatively. The second paddle 6 can be deformed. The deformed layer 601 of the second paddle 6 generates shear deformation, so that both ends of the composite paddle 4 can smoothly rotate relatively. The whole composite paddle 4 is torsionally deformed. Centrifugal force is transmitted to the composite paddle 4 part fixedly connected with the main shaft 2 and to the hub through the main shaft 2, and the radial load of the composite paddle 4 is transmitted by the compression of the deformed layer 601. It should also be noted that the first paddle 5 is of a rigid structure, so that the structural strength of the composite paddle 4 is ensured. The cross-sectional shape of the cascade 602 of the second paddle 6 is consistent with that of the first paddle 5. The cascade 602 further improves the structural strength of the composite paddle 4. The flexible skin 603 covers the deformed layer 601 and the cascade 602, so that the streamlined design of the composite paddle 4 is ensured, and the resistance of the negative torsion variable paddle 100 is reduced. The torsional variation of the composite paddle 4 is realized by using the mechanical structure, and the working reliability of the negative torsion variable paddle 100 is improved under the premise of without changing the radius of the composite paddle 4.

It should also be explained here that when the number of the second paddles 6 is one group, the group of second paddles 6 are located at the position closest to the control assembly 1, the output end of the driver 3 is connected with a part of the cascades 602 of the second paddles 6, so that the remaining cascades 602 can rotate relatively to avoid from affecting the deformation of the second paddle 6.

In the specific embodiment, the numbers of first paddles 5 and second paddles 6 are multiple. The first paddles 5 and the second paddles 6 are arranged at intervals. The paddles farthest away from and nearest to the control assembly 1 are the first paddles 5, so that the connection between the main shaft 2 and the driver 3 is facilitated. The output end of the driver 3 is connected with the trailing edge of the first paddle 5 closest to the control assembly 1, and the main shaft 2 is fixedly connected with the first paddle 5 farthest away from the control assembly 1. In practical application, the number of the first paddles 5 and second paddles 6 can be set according to the specific requirements of torsional variation, so that the flexibility and adaptability of the negative torsion variable paddle 100 are improved. Taking FIG. 1 as an example, five first paddles 5 and four second paddles 6 are provided.

In practical application, the length of the second paddle 6 close to the control assembly 1 can be longer than that of the second paddle 6 far away from the control assembly 1. The negative torsion variable paddle 100 can be twisted more violently in a fixed wing mode, and the torsion is concentrated at the root position of the composite paddle 4. Therefore, the second paddle 6 with a longer length can be arranged near the root position of the composite paddle 4 in order to achieve greater negative torsion during flight. At the same time, the multiple second paddles 6 can be centrally distributed in the area close to the root of the composite paddle 4, and then the large torsional deformation at the paddle root position can be realized by arranging the second paddles 6 more densely at the position adjacent to the paddle root. The position of the laminated elastomer structure is reasonably arranged, and the structure with a corresponding length is arranged at the position where the negative torsion distribution needs to be changed emphatically to realize continuous deformation, which is beneficial to improving the flight performance of the negative torsion variable paddle 100 and the craft. When the deformation amount required in the local area is large, the length of the corresponding second paddle 6 can be increased according to the demand.

Specifically, the deformed layer 601 is of a hollow cylindrical structure, and the deformed layer 601 and the cascade 602 both sleeve the main shaft 2 to facilitate installation and positioning.

In order to ensure that the deformed layer 601 can generate certain shear deformation, the deformed layer 601 is made of rubber, and the cascade 602 is made of metal. The deformed layer 601 is vulcanized and connected with the cascade 602, so that the structural integrity of the second paddle 6 is improved, and then the structural strength of the negative torsion variable paddle 100 is ensured.

Figure 4:
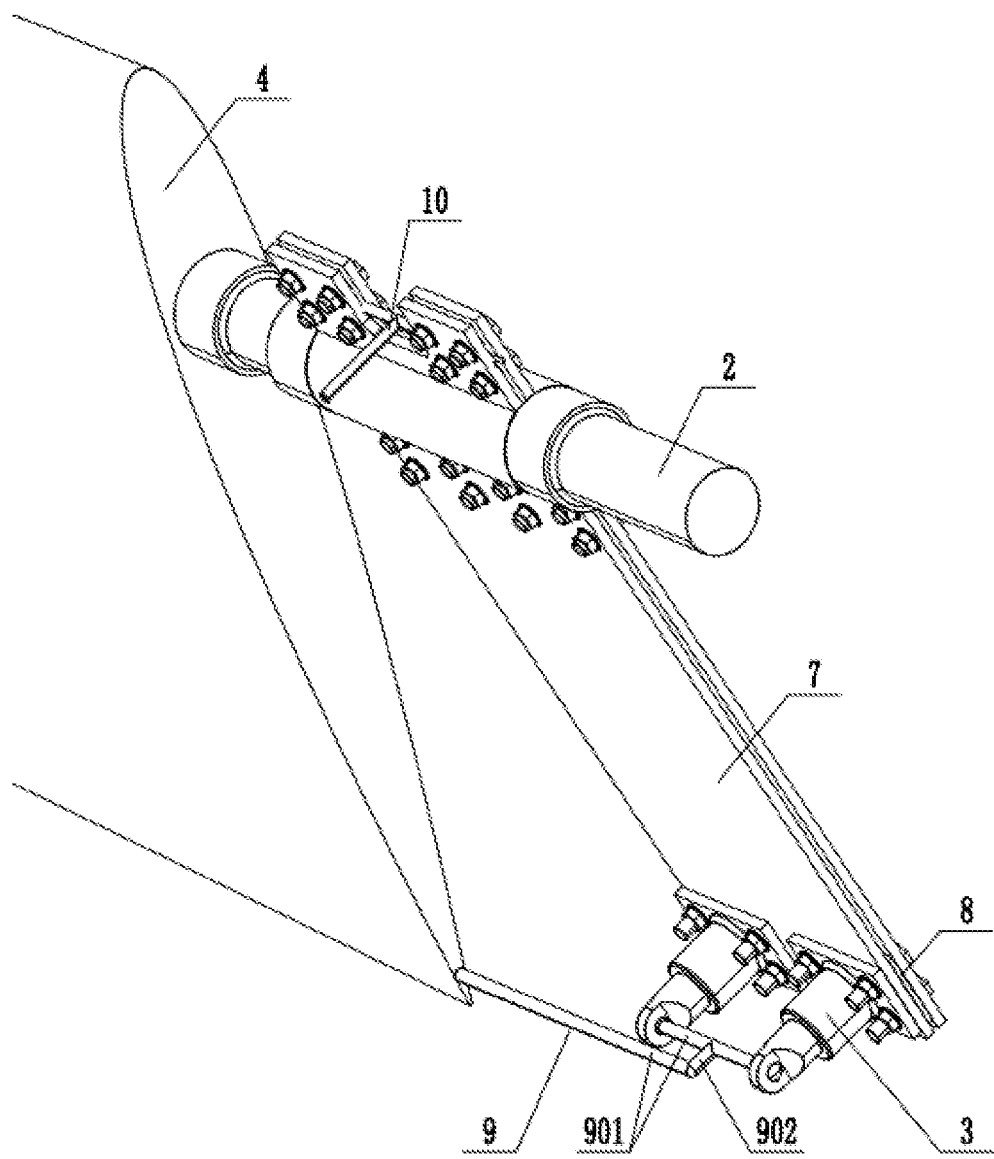
FIG. 4 is a structural schematic diagram of a control assembly of a negative torsion variable paddle in the present disclosure.

More specifically, the control assembly 1 also includes clamping plates 7. The clamping plate 7 is provided with a protrusion adapted to the main shaft 2. As shown in FIG. 4, in order to facilitate to fix the main shaft 2, the number of the clamping plates 7 is two. The two clamping plates 7 are symmetrically arranged with an axis of the main shaft 2 as a symmetry axis. The two clamping plates 7 are connected and fixed with the main shaft 2 through bolts, and a base plate 8 is arranged between the two clamping plates 7, so that the connecting firmness of the clamping plates 7 and the main shaft is improved. The pull rod 10 is rotatably connected with the clamping plate 7, and the driver 3 is fixed on the clamping plate 7. The clamping plate 7 provides stable support for the driver 3.

Wherein, the pull rod 10 is T-shaped, and a notch is formed in the clamping plate 7 to avoid from affecting the rotation of the pull rod 10. A bearing is arranged between the pull rod 10 and the clamping plate 7, so that the relative rotation smoothness between the pull rod 10 and the clamping plate 7 is ensured.

In the specific embodiment, the driver 3 is a linear steering engine. The output end of the driver 3 is connected with the composite paddle by using a connecting rod 9. The driver 3 drives the connecting rod 9 to push the trailing edge of the composite paddle 4, so that the composite paddle 4 can be smoothly torsionally varied.

Further, the number of the drivers 3 is two groups. The connecting rod 9 includes a transverse rod 901 and a longitudinal rod 902 which are connected. The transverse rod 901 is parallel to the axial direction of the main shaft 2, and the longitudinal rod 902 is arranged vertical to the transverse rod 901. The longitudinal rod 902 is connected to two transverse rods 901. Both ends of one transverse rod 901 are connected to the output end of the driver 3 by using ball hinges. The other transverse rod 901 is slidably and rotatably connected with the composite paddle. The rotating axis, relative to the composite paddle 4, of the connecting rod 9 is parallel to the axis direction of the main shaft 2. The sliding axis, relative to the composite paddle 4, of the connecting rod 9 is parallel to the axis direction of the main shaft 2. The composite paddle 4 can rotate relative to the transverse rod 901 of the connecting rod 9. At the same time, the composite paddle 4 can also generate axial movement relative to the transverse rod 901 of the connecting rod 9 to avoid from affecting the torsional deformation of the composite paddle 4, so that the working reliability of the negative torsion variable paddle 100 is improved.

According to the negative torsion variable paddle 100 in the present disclosure, the torsional variation of the composite paddle 4 is realized by using the mechanical structure, so that the reliability is relatively high. Then, the structural characteristics of the composite paddle 4 along the radius is not changed, and the negative torsion variable paddle 100 can be applied to helicopter hingeless hubs, so that the adaptability of the negative torsion variable paddle 100 is improved.

Further, the present disclosure also provides a rotor craft, including the negative torsion variable paddle 100. The composite paddle 4 is driven by using the driver 3, the inherent collective control of the helicopter rotor is decoupled with the torsional variation of the rotor, and the variation of negative torsion does not affect original control, so that the adaptability of the rotor craft is improved. In addition, in a specific flight mode, the paddle of the rotor craft can change to the corresponding torsion distribution, and the variable negative torsion paddle 100 cannot be subjected to alternating loads similar to the hub position during working, so that the service life is prolonged.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In summary, the contents of this specification should not be understood as the limitation of the present disclosure.

What is claimed is:

1. A negative torsion variable paddle, comprising: a control assembly; the control assembly comprises a main shaft and a driver, the main shaft is connected with a hub, the driver is connected with the main shaft, and the main shaft is connected with a pull rod of a swashplate; a composite paddle; the main shaft is connected with a leading edge of the composite paddle, an output end of the driver is in transmission connection with a trailing edge of the composite paddle, and the driver is configured to push the trailing edge of the composite paddle; the composite paddle comprises first paddles and second paddles, the first paddle is connected with the second paddle, the first paddle or the second paddle farthest away from the control assembly is fixedly connected with the main shaft, and the rest of the first paddles and the second paddles are rotatably connected with the main shaft; the first paddle is of a rigid structure, the second paddle comprises a deformed layer, a cascade and a flexible skin, the deformed layer is made of elastic materials, the number of the deformed layers is multiple, the deformed layers are arranged in parallel along the direction of the main shaft, the adjacent deformed layers are connected at intervals by using the cascade, the cross-sectional shape of the cascade is consistent with that of the first paddle, the flexible skin covers the outside of the deformed layer and the cascade, and the flexible skin is connected with the first paddle.

2. The negative torsion variable paddle according to claim 1, wherein the first paddles and the second paddles are arranged at intervals, the paddles farthest away from the control assembly and closest to the control assembly are the first paddles, and the output end of the driver is connected with a trailing edge of the first paddle closest to the control assembly.

3. The negative torsion variable paddle according to claim 2, wherein the length of the second paddle closer to the control assembly is longer than that of the second paddle farther away from the control assembly.

4. The negative torsion variable paddle according to claim 1, wherein the deformed layer is of a hollow cylindrical structure, and the deformed layer and the cascade both sleeve on the main shaft.

5. The negative torsion variable paddle according to claim 1, wherein the deformed layer is made of rubber, the cascade is made of metal, and the deformed layer is vulcanized and connected with the cascade.

6. The negative torsion variable paddle according to claim 1, wherein the control assembly also comprises clamping plates, the clamping plate is provided with a protrusion adapted to the main shaft, the number of the clamping plates is two, the two clamping plates are symmetrically arranged with an axis of the main shaft as a symmetry axis, the two clamping plates are connected and fixed with the main shaft through bolts, a base plate is arranged between the two clamping plates, the pull rod is rotatably connected with the clamping plate, and the driver is fixed on the clamping plate.

7. The negative torsion variable paddle according to claim 6, wherein the pull rod is T-shaped, a notch is formed in the clamping plate, and a bearing is arranged between the pull rod and the clamping plate.

8. The negative torsion variable paddle according to claim 6, wherein the driver is a linear steering engine, and the output end of the driver is connected with the composite paddle by using a connecting rod.

9. The negative torsion variable paddle according to claim 8, wherein one end of the connecting rod is connected with the output end of the driver by using a ball hinge, and the other end of the connecting rod is slidably and rotatably connected with the composite paddle; a rotating axis, relative to the composite paddle, of the connecting rod is parallel to the axis direction of the main shaft; and a sliding axis, relative to the composite paddle, of the connecting rod is parallel to the axis direction of the main shaft.

10. A rotor for a rotor craft, comprising: a negative torsion variable paddle, wherein the negative torsion variable paddle includes: a control assembly; the control assembly comprises a main shaft and a driver, the main shaft is connected with a hub, the driver is connected with the main shaft, and the main shaft is connected with a pull rod of a swashplate; a composite paddle; the main shaft is connected with a leading edge of the composite paddle, an output end of the driver is in transmission connection with a trailing edge of the composite paddle, and the driver can push the trailing edge of the composite paddle; the composite paddle comprises first paddles and second paddles, the first paddle is connected with the second paddle, the first paddle or the second paddle farthest away from the control assembly is fixedly connected with the main shaft, and the rest of the first paddles and the second paddles are rotatably connected with the main shaft; the first paddle is of a rigid structure, the second paddle comprises a deformed layer, a cascade and a flexible skin, the deformed layer is made of elastic materials, the number of the deformed layers is multiple, the deformed layers are arranged in parallel along the direction of the main shaft, the adjacent deformed layers are connected at intervals by using the cascade, the cross-sectional shape of the cascade is consistent with that of the first paddle, the flexible skin covers the outside of the deformed layer and the cascade, and the flexible skin is connected with the first paddle.

11. The rotor craft of claim 10, wherein the first paddles and the second paddles are arranged at intervals, the paddles farthest away from the control assembly and closest to the control assembly are the first paddles, and the output end of the driver is connected with a trailing edge of the first paddle closest to the control assembly.

12. The rotor craft of claim 11, wherein the length of the second paddle closer to the control assembly is longer than that of the second paddle farther away from the control assembly.

13. The rotor craft of claim 10, wherein the deformed layer is of a hollow cylindrical structure, and the deformed layer and the cascade both sleeve on the main shaft.

14. The rotor craft of claim 10, wherein the deformed layer is made of rubber, the cascade is made of metal, and the deformed layer is vulcanized and connected with the cascade.

15. The rotor craft of claim 10, wherein the control assembly also comprises clamping plates, the clamping plate is provided with a protrusion adapted to the main shaft, the number of the clamping plates is two, the two clamping plates are symmetrically arranged with an axis of the main shaft as a symmetry axis, the two clamping plates are connected and fixed with the main shaft through bolts, a base plate is arranged between the two clamping plates, the pull rod is rotatably connected with the clamping plate, and the driver is fixed on the clamping plate.

16. The rotor craft of claim 15, wherein the pull rod is T-shaped, a notch is formed in the clamping plate, and a bearing is arranged between the pull rod and the clamping plate.

17. The rotor craft of claim 15, wherein the driver is a linear steering engine, and the output end of the driver is connected with the composite paddle by using a connecting rod.

18. The rotor craft of claim 17, wherein one end of the connecting rod is connected with the output end of the driver by using a ball hinge, and the other end of the connecting rod is slidably and rotatably connected with the composite paddle; a rotating axis, relative to the composite paddle, of the connecting rod is parallel to the axis direction of the main shaft; and a sliding axis, relative to the composite paddle, of the connecting rod is parallel to the axis direction of the main shaft.

\* \* \* \* \*